US012450192B2

(12) United States Patent
Smeloy et al.

(10) Patent No.: US 12,450,192 B2
(45) Date of Patent: *Oct. 21, 2025

(54) CRYPTOCURRENCY MINER WITH MULTIPLE POWER DOMAINS

(71) Applicant: Chain Reaction Ltd., Yokneam (IL)

(72) Inventors: Yossi Smeloy, Kamon (IL); Gil Shefer, Haifa (IL); Rony Gutierrez, Pardes Hanna-Karkur (IL)

(73) Assignee: Chain Reaction Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,121

(22) Filed: May 6, 2024

(65) Prior Publication Data

US 2024/0289298 A1    Aug. 29, 2024

Related U.S. Application Data

(63) Continuation of application No. 17/489,264, filed on Sep. 29, 2021, now Pat. No. 11,989,153.

(51) Int. Cl.
*G06F 15/16* (2006.01)
*G06F 1/26* (2006.01)
(Continued)

(52) U.S. Cl.
CPC ............ *G06F 15/161* (2013.01); *G06F 1/26* (2013.01); *H04L 9/0643* (2013.01);
(Continued)

(58) Field of Classification Search
CPC ........ G06F 1/26; G06F 15/161; G06F 15/177; G06Q 30/06; G06Q 40/04; G06Q 50/06; H04L 9/0643; H04L 9/50
See application file for complete search history.

(56) References Cited

U.S. PATENT DOCUMENTS

| 6,429,706 B1 * | 8/2002 | Amin ................. G06F 1/26 327/143 |
| 11,989,153 B2 * | 5/2024 | Smeloy ................. H04L 9/50 |

(Continued)

FOREIGN PATENT DOCUMENTS

| JP | 1998145970 | 5/1998 |
| WO | 2015077378 A1 | 5/2015 |

OTHER PUBLICATIONS

"AsicBoost—A Speedup for Bitcoin Mining", Dr. Timo Hanke, Mar. 31, 2016, 10 pages.
(Continued)

*Primary Examiner* — Terrell S Johnson
(74) *Attorney, Agent, or Firm* — McAndrews, Held & Malloy, Ltd.

(57) ABSTRACT

A cryptocurrency miner includes a control power supply, a compute power supply, a compute module, and a controller. The compute module includes control circuitry powered based on first power supplied by the control power supply and a compute engine powered based on second power supplied by the compute power supply. The controller causes the control power supply to apply the first power to the control circuitry. The controller further causes the compute power supply to apply the second power to the compute engine after initialization of the control circuitry.

22 Claims, 5 Drawing Sheets

(51) Int. Cl.
  *G06F 15/177* (2006.01)
  *G06Q 30/06* (2023.01)
  *G06Q 40/04* (2012.01)
  *G06Q 50/06* (2024.01)
  *H04L 9/00* (2022.01)
  *H04L 9/06* (2006.01)

(52) U.S. Cl.
  CPC .......... *G06F 15/177* (2013.01); *G06Q 30/06* (2013.01); *G06Q 40/04* (2013.01); *G06Q 50/06* (2013.01); *H04L 9/50* (2022.05)

(56) References Cited

U.S. PATENT DOCUMENTS

| | | |
|---|---|---|
| 2002/0112191 A1 | 8/2002 | Pelissier et al. |
| 2016/0164672 A1* | 6/2016 | Karighattam ......... H04L 9/0643 380/28 |
| 2022/0334629 A1 | 10/2022 | Marks et al. |

OTHER PUBLICATIONS

"Crypto Mining: Network Difficulty, Share Difficulty and Hash Functions", Luxor Tech, Feb. 20, 2020, 6 pages.
"Mastering Bitcoin", Andreas M. Antonopoulos, Published by O'Reilly Media, Inc. 2010, 87 pages.
Federal Information Processing Standards Publication, Aug. 2015, 36 pages.
"Optimising the SHA256 Hashing Algorithm for Faster and More Efficient Bitcoin Mining", Rahul P. Naik, Department of Computer Science, University College of London, Sep. 2, 2013, 65 pages.
BitmainAntminer—Youtube video, https://www.youtube.com/watch?v=_R36wWMM34M.
MicroBT Whatsmainer—Youtube video, https://www.youtube.com/watch?v=6vtq1m8w5eQ.
SHA-256 The Center Of Bitcoin—Andreas M. Antonopoulos—Youtube video, https://www.youtube.com/watch?v=TvqDbLnsSNs.
International Search Report and Written Opinion for PCT/IB2022/058733, mailed Jan. 3, 2023, 8 pages.

* cited by examiner

CRYPTOCURRENCY MINER WITH MULTIPLE POWER DOMAINS

RELATED APPLICATIONS

This application is a continuation of U.S. patent application Ser. No. 17/489,264, having a filing date of Sep. 29, 2021, the contents of the above-identified application is hereby incorporated herein by reference in its entirety.

BACKGROUND

Cryptocurrency is a digital asset designed to work as a medium of exchange. Individual coin ownership records are stored in a ledger or blockchain. Unlike conventional currencies, cryptocurrency does not typically exist in a physical form and is typically not issued by a central authority.

A blockchain provides a continuously growing list of records, called blocks, which are linked and secured using cryptography. Each block typically contains a hash pointer as a link to a previous block, a timestamp, and transaction data. By design, blockchains are inherently resistant to modification of the data. A blockchain is typically managed by a peer-to-peer network collectively adhering to a protocol for validating new blocks. Once recorded, the data in any given block cannot be altered retroactively without the alteration of all subsequent blocks, which requires collusion of the network majority.

In cryptocurrency networks, miners validate cryptocurrency transactions of a new candidate block for the blockchain via a Proof-of-Work algorithm. A side effect of validating the candidate block is the creation of newly minted cryptocurrency. The newly minted cryptocurrency as well as associated services fees are awarded to the miner that was the first miner to validate the candidate block and thus complete the Proof-of-Work algorithm.

This winner-takes-all compensation scheme has created an arms race for more efficient miners. Furthermore, mining pools have developed in an attempt to lessen the risks associated with the winner-takes-all compensation scheme. Miners or members of a mining pool share their processing power and split any obtained reward among the members according to the amount of work they contributed.

Limitations and disadvantages of conventional and traditional cryptocurrency mining approaches will become apparent to one of skill in the art, through comparison of such approaches with the present disclosure as set forth in the remainder of the present disclosure with reference to the drawings.

SUMMARY

Figure 1:
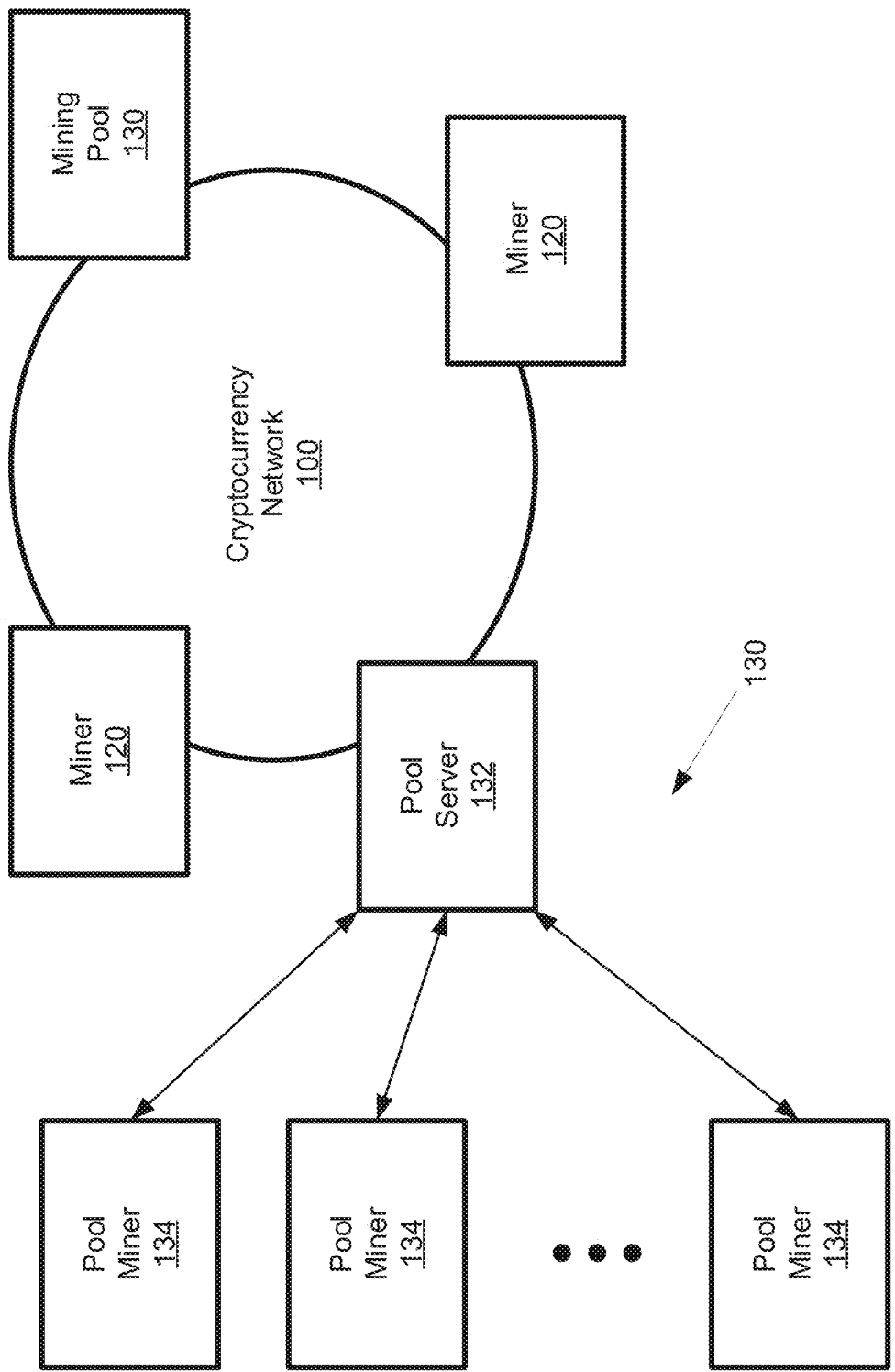
FIG. 1 shows a cryptocurrency network comprising miners in accordance with various aspects of the present disclosure.

Cryptocurrency miners and associated methods and apparatus are substantially shown in and/or described in connection with at least one of the figures, and are set forth more completely in the claims.

Advantages, aspects, and novel features of the present disclosure, as well as details of illustrated embodiments, will be more fully understood from the following description and drawings.

DETAILED DESCRIPTION OF VARIOUS ASPECTS OF THE DISCLOSURE

Various aspects of the present disclosure are presented by way of example. Such examples are non-limiting, and thus the scope of various aspects of the present disclosure should not necessarily be limited by any particular characteristics of the provided examples. In the following, the phrases "for example," "e.g.," and "exemplary" are non-limiting and are generally synonymous with "by way of example and not limitation," "for example and not limitation," and the like.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z."

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section could be termed a second element, a second component, or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a component may be turned sideways so that its "top" surface is facing horizontally and its "side" surface is facing vertically, without departing from the teachings of the present disclosure.

In the drawings, various dimensions (e.g., thicknesses, widths, lengths, etc.)

may be exaggerated for illustrative clarity. Additionally, like reference numbers are utilized to refer to like elements through the discussions of various examples.

The discussion will now refer to various example illustrations provided to enhance the understanding of the various aspects of the present disclosure. It should be understood that the scope of this disclosure is not limited by the specific characteristics of the examples provided and discussed herein.

Referring now to FIG. 1, an embodiment of a cryptocurrency network 100 is shown. In particular, the cryptocurrency network 100 may be implemented as a Bitcoin network. The present disclosure focuses primarily upon Bitcoin and the Bitcoin network. However, aspects of the present disclosure are also applicable to other cryptocurrencies, also referred to as Altcoin, such as, for example, Litecoin, Dogecoin, Ethereum, etc. and their respective networks. Similarly, the present disclosure focuses primarily on aspects of mining pool miners that are members of a Bitcoin mining pool. However, aspects of the present disclosure are also applicable to standalone miners, distributed miners, and/or mining pool miners of Bitcoin and/or Altcoin networks.

As shown, the cryptocurrency network 100 may include multiple miners 120 (e.g., standalone miners and/or distributed miners) and multiple mining pools 130, which are operably coupled to one another via various networks such as LANs, WANs, cellular, satellite, and/or communication networks. The miners 120 and mining pools 130 of the cryptocurrency network compete with each other in a decentralized manner to create a new block of processed Bitcoin transactions (e.g., transfers of Bitcoin between parties), and add the newly created block to the blockchain for the cryptocurrency network 100.

The blockchain is essentially a growing list or ledger of cryptographically linked records of transactions called blocks. Each block includes a cryptographic hash of the previous block, a timestamp, transaction data, and potentially other fields. The blocks form a chain, with each additional block reinforcing the ones before it. As such, blockchains are resistant to modification because any given block cannot be altered retroactively without altering all subsequent blocks.

The creation of a new block is designed to be computationally intensive so as to require the cryptocurrency network 100 to spend a specified amount of time on average to create a new block. For example, the Bitcoin network is designed to create and add a new block to the blockchain every 10 minutes on average. The cryptocurrency network 100 periodically adjusts the computational difficulty of creating a new block to maintain the 10 minute target. In this manner, the cryptocurrency network 100 may create new blocks in a relatively steady manner despite ever changing computational capacity. For example, adding new miners 120, mining pool miners 134, and/or mining pools 130 to the cryptocurrency network 100 increases the overall computational capacity of the cryptocurrency network 100. Such increased computational capacity reduces the time required to create and add a new block to blockchain. However, the cryptocurrency network 100 periodically adjusts the computational difficulty of creating a new block to maintain the 10 minute target. As a result, the cryptocurrency network 100 eventually detects that blocks are being created at a rate faster than the 10 minute target and appropriately increases the difficulty of creating a new block so as to counteract the increased computational capacity and maintain the roughly 10 minutes per block average.

To incentivize parties to undertake the computationally difficult task of generating a new block, the cryptocurrency network 100 compensates the miners 120 and mining pools 130 for their efforts. In particular, each new block generates a quantity of new currency (e.g., 6.25 Bitcoins) as well as service fees from all transactions in the block. These new coins and service fees are awarded to the first entity (e.g., miner 120 or mining pool 130) that solves the Proof-of-Work algorithm for the next block to be added to the blockchain. The Proof-of-Work algorithm is essentially a computationally intensive process that creates a new block that satisfies a cryptographic hash target. Thus, the miners 120 and mining pools 130 are in competition with one another since only the first entity to solve the Proof-of-Work algorithm receives the associated block award.

Given the all or nothing nature of the block awards, mining pools 130 have formed. In general, a mining pool 130 includes a pool server 132 and several mining pool miners or members 134. The pool server 132 divides the Proof-of-Work into substantially smaller jobs and distributes such smaller jobs to the mining pool miners 134 in the mining pool 130. By completing smaller jobs, mining pool miners 134 obtain shares of a block award won by the mining pool 130. In this manner, each of the mining pool miners 134 may earn a smaller award (e.g., a share of a block award proportional to their contribution to completing the Proof-of-Work) on a more frequent basis than if each of the mining pool miners 134 were operating as a miner 120 on its own.

Figure 2:
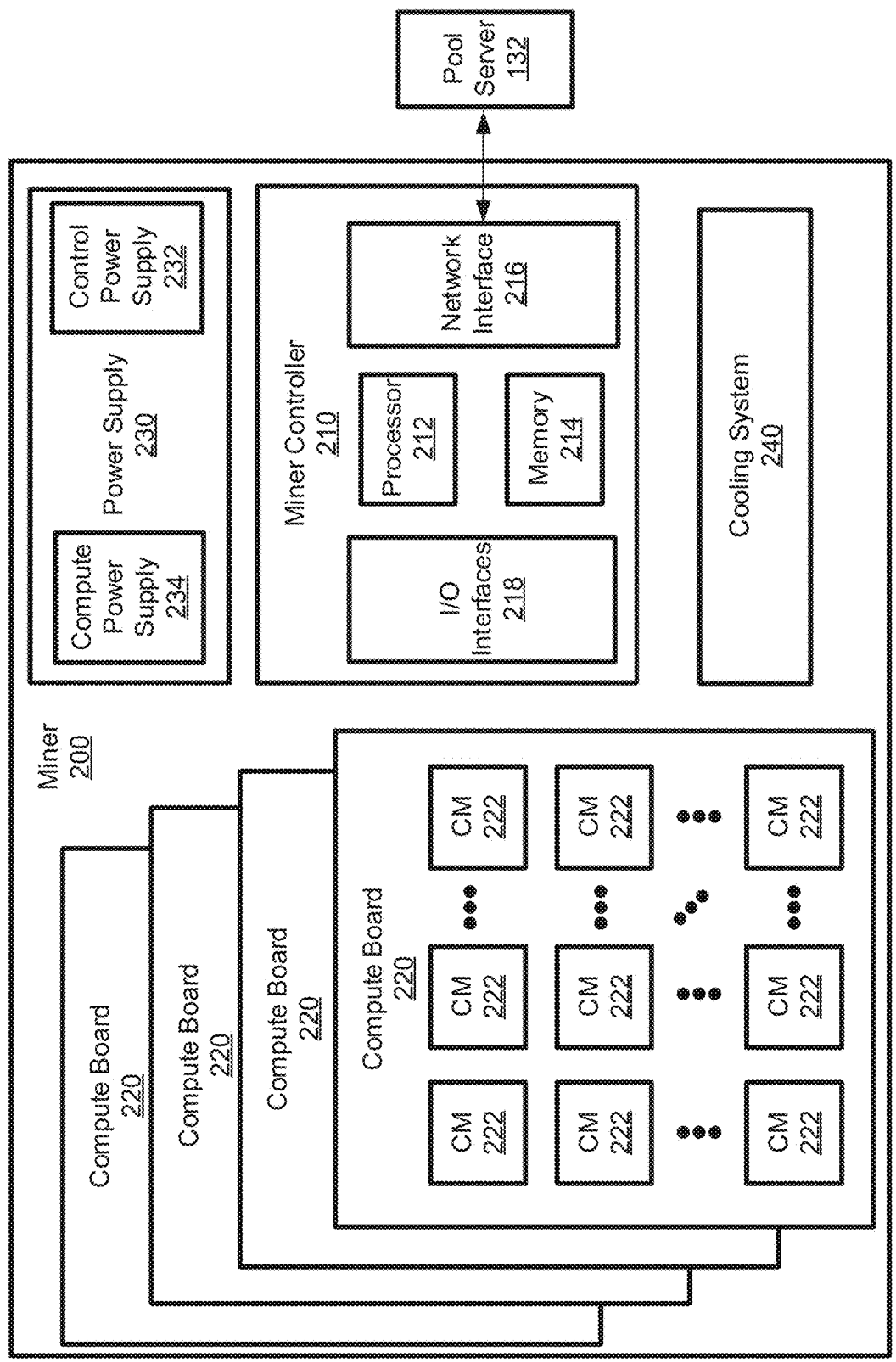
FIG. 2 shows a block diagram of a miner of FIG. 1.

A block diagram of a miner 200 is shown in FIG. 2, which is suitable for implementing one of the mining pool miners 134 of the mining pool 130. As shown, the miner 200 includes a miner controller 210, compute boards 220, a power supply 230, and a cooling system 240.

The miner controller 210 generally manages the components of the miner 200. In particular, the miner controller 210 interacts with pool server 132 on the behalf of the compute boards 220. To this end, the miner controller 210 obtains jobs from the pool server 132, distributes the jobs to the compute boards 220, and submits Proof-of-Work to the pool server 132 for the jobs completed by the compute boards 220.

As shown, the miner controller 210 may include a processor 212, memory 214, a network interface 216, and various input/output (I/O) interfaces 218. The processor 212 may be configured to execute instructions, manipulate data, and generally control operation of the other components of the miner 200 as a result of its execution. To this end, the processor 212 may include a general-purpose processor such as an x86 processor or an ARM processor, which are available from various vendors. However, the processor 212 may also be implemented using an application specific processor, programmable gate arrays, and/or other logic circuitry.

The memory 214 may store instructions and/or data to be executed and/or otherwise accessed by the processor 212. In some embodiments, the memory 214 may be completely and/or partially integrated with the processor 212. The memory 214 may store software and/or firmware instructions, which may be executed by processor 212. The memory 214 may further store various types of data which the processor 212 may access, modify, and/or otherwise manipulate in response to executing instructions from memory 214. To this end, the memory 214 may comprise volatile and/or non-volatile storage devices such as random-access memory (RAM) devices, read only memory (ROM) devices, flash memory devices, solid state device (SSD) drives, etc.

The network interface 216 may enable the miner 200 to communicate with other computing devices such as the pool server 132. In particular, the network interface 216 may permit the processor 212 to obtain jobs from the pool server 132 and submit completed jobs to the pool server 132. To this end, the networking interface 216 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, 5G, etc.), and/or some other type of networking interface capable of providing a communications link between the miner 200 and other devices such as the pool server 132.

Finally, the I/O interfaces 218 may generally provide communications and control paths between the processor 212 and other components of the miner 200 such as the compute boards 220, power supply 230, and cooling system 240. Via such interfaces, the processor 212 may control the operation of such components. For example, the processor 212 may use such I/O interfaces 218 to initialize the compute boards 220, distribute jobs to the compute boards 220, receive completed jobs from the compute boards 220, selectively enable/disable the power supply 230, and selectively turn on/off cooling system 240, among other things.

In one embodiment, the one or more I/O interfaces 218 include a communication interfaces such as a Serial Peripheral Interface (SPI) interface or an Inter-Integrated Circuit (I2C) interface via which the processor 212 may communicate with the compute boards 220. In particular, each compute board 220 may include a communication interface, e.g., a SPI interface. A four-wire serial interface bus may connect the compute modules 222 of the compute boards 220 in series to the miner controller 210 via their respective SPI interfaces. In such an embodiment, the miner controller 210 and compute modules 222 may operate in a master-slave arrangement, wherein the miner controller 210 acts as the single master of the SPI four wire bus and each of the compute modules 222 operate as slaves on the SPI four wire bus. In other embodiments, the roles may be reversed with the computer modules 222 operating as masters and the miner controller 210 acting a slave. In such embodiments, the computer modules 222 and miner controller 210 may operate in a pop/push model where each compute module 222 takes or pops jobs from the miner controller 210 when ready and pushes completed jobs to the miner controller 210 upon completion. Further, while the miner controller 210 and computer modules 222 utilize an SPI interface and associated bus to communicate, other interconnect technologies may be used in other embodiments.

Each compute board 220 may include several compute modules 222. Each compute module 222, likewise, may include several compute engines that perform computational aspects of completing a job. In one embodiment, each compute module 222 is implemented via an application specific integrated circuit (ASIC). However, the compute modules 222 and their respective compute engines may be provided by other forms of circuitry.

In one embodiment, a miner 200 includes 4 compute boards, each compute board 220 includes 28 compute modules 222, and each compute module 222 includes 12 compute engines. Such a miner 200 thus provides 1,344 (4×28× 8) compute engines. The above quantities of compute boards 220, compute modules 222, and compute engines were provided merely for context. Other embodiments of the miner 200 may include different quantities of such components.

Per the Bitcoin standard, a candidate block header must have a message digest or hash value that satisfies a current target value in order to be deemed a valid block header suitable for adding to the blockchain. Such a message digest is computed per a double SHA-256 hash of the block header. Specifically, a compute engine generates a double SHA-256 hash of a candidate block header by computing a first message digest or hash value of the candidate block header per the SHA-256 algorithm specified by Federal Information Processing Standards Publication 180-4 (FIPS Pub. 180-4). The compute engine then computes a second message digest or final hash value of the candidate block header by performing a SHA-256 hash of the first message digest. Thus, the compute engine performs a double hash of the candidate block header to determine whether its double hash value satisfies a target value and is therefore a valid block header. Thus, for Bitcoin and various Altcoin embodiments of the miner 200, the compute boards 220 may also be referred to as hashing boards 220 since the compute engines perform various hashing functions and/or various cryptographic algorithms addressing a similar goal as such hashing functions.

While Bitcoin and some other cryptocurrencies utilize the SHA-256 hashing algorithm as part of their Proof-of-Work algorithms, other cryptocurrencies may use other cryptographic and/or hashing algorithms as part of their Proof-of-Work algorithm. For example, Litecoin and Dogecoin use the scrypt key-derivation function and Ethereum uses the Ethash algorithm. Thus, for embodiments of the miner 200 designed to mine such Altcoins, the compute boards 220 may include compute modules 222 designed to compute these other cryptographic algorithms.

The power supply 230 generally converts alternating current (AC) voltage to a direct current (DC) voltage suitable for the compute boards 220 and other components of the miner 200. In one embodiment, the power supply 230 receives 220V AC voltage from, for example, a wall mains outlet and efficiently converts the received power to one or more DC voltages distributed to various components of the miner 200. As shown, the power supply 230 may include a control power supply 232, one or more compute power supplies 234, as well as other power supplies. The control power supply 232 may supply control power (e.g., via one or more supplied DC voltages) used to power a control power domain of the compute boards 220. The one or more compute power supplies 234 may supply compute power (e.g., via one or more supplied DC voltages) used to power a compute power domain of the compute boards 220.

In one embodiment, the control power supply 232 and compute power supply 234 are selectively enabled via one or more signals of the miner controller 210. As such, the miner controller 210 may selectively enable/disable the power supplies 232, 234 so as to selectively power-up/power-down the respective power domains of the compute boards 220. For example, the miner controller 210 may power-up the control power domain of the compute boards 220 in order to configure and confirm operation of the compute boards 220 before powering-up the compute domain, which in certain embodiments consumes substantially more power than the control power domain.

The cooling system 240 generally comprise active thermal components (e.g., cooling fans, liquid cooling systems, Peltier cooling modules, etc.) that aid in maintaining the other components of the miner 200, especially the compute boards 220, within a thermal envelope associated with high operating efficiency. Beyond the active thermal components of the cooling system 240, the miner 200 may include other passive thermal components such as heat sinks, heat pipes, thermal paste, etc. that further aid in maintaining the components of the miner 200 within the desired thermal envelope.

Figure 3:
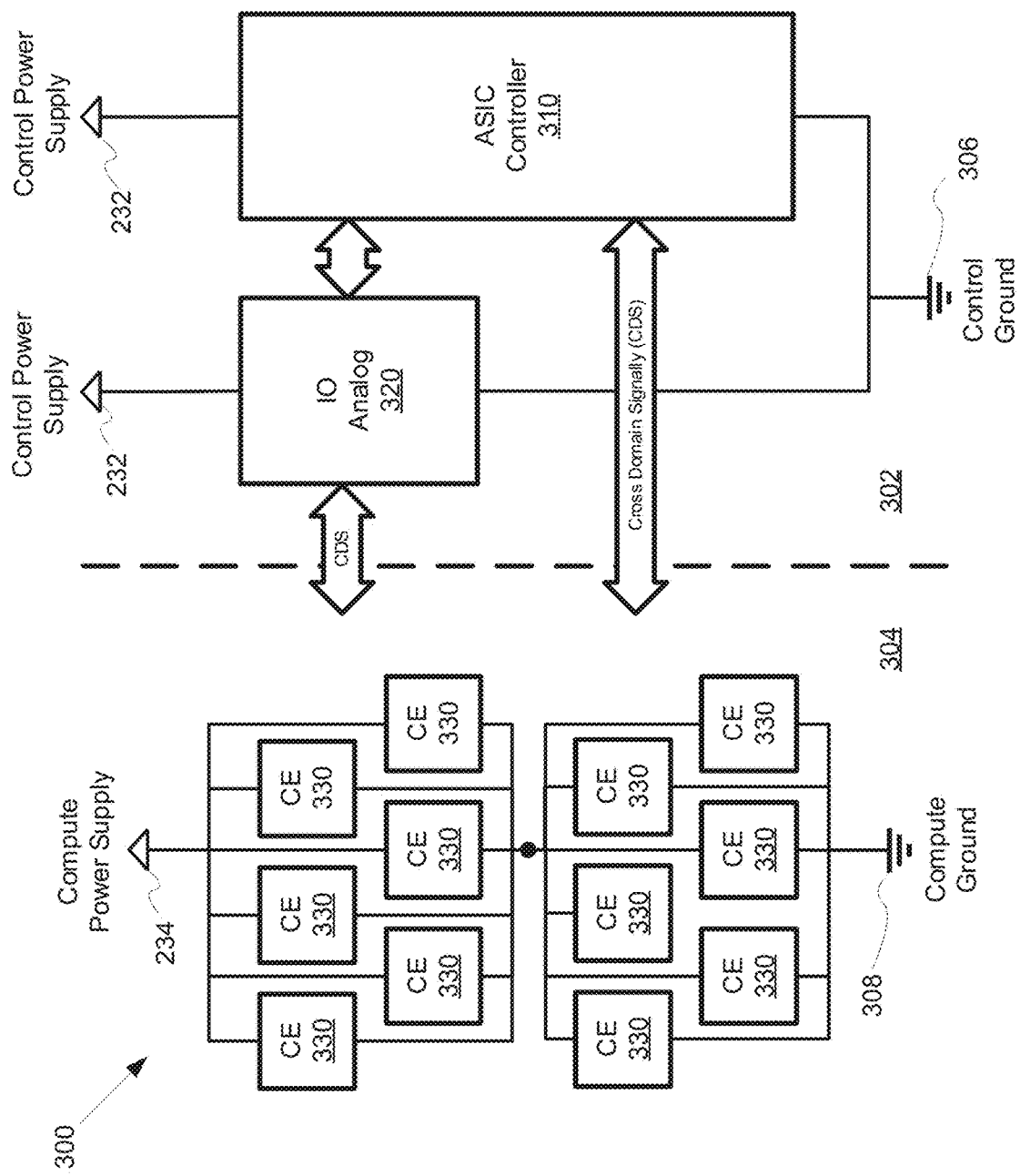
FIG. 3 shows a block diagram of a compute module of FIG. 2.

Referring now to FIG. 3, a block diagram depicts various aspects of an ASIC 300 that implements a compute module 222 of the compute board 220. As shown, the ASIC 300 comprises a control power domain (first power domain) 302 and one or more compute power domains (a second power domain) 304. Control circuitry, such as a compute module controller or ASIC controller 310, resides in the control power domain 302. Support circuitry, such as Input/Output (I/O) circuitry 320, also resides in the control power domain 302. Several compute engines 330 reside in the compute power domain 304.

In general, the ASIC controller 310 configures and controls the components of the ASIC 300. The ASIC controller 310 further provides an interface between the miner controller 210 and the compute engines 330. To this end, the ASIC controller 310, among other things, receives jobs from the miner controller 210, distributes the jobs to the compute engines 330, and returns results of the completed jobs to the miner controller 210.

The I/O circuitry 320 may include various I/O circuits that provide internal I/O interfaces between components of the ASIC 300 and various I/O circuits that provide external I/O interfaces between ASIC 300 and external components such as the miner controller 210 and other ASICs 300. The I/O circuitry 320 may further include various circuits that support and drive the compute engines 330. For example, the I/O circuitry 320 may include voltage-controlled oscillators (VCOs) and/or phase-locked loops (PLLs) that provide clock signals that drive the computations of the compute engines 330. The I/O circuitry 320 may further include analog to digital converters (ADC), which may be used to measure various temperatures and internal voltages of the compute engines 330 and/or other components of the ASIC 300.

Each compute engine 330 may perform computational aspects of creating a valid block header and/or aspects of a Proof-of-Work algorithm. In particular, each compute engine 330 may generate a double SHA-256 hash of a candidate block header as explained above. As such, the compute engine 330 in certain embodiments may be referred to as SHA engines or hashing engines. While Bitcoin and some other cryptocurrencies utilizes the SHA-256 hashing algorithm as part of their Proof-of-Work algorithms, other cryptocurrencies may use other cryptographic and/or hashing algorithms as part of their Proof-of-Work algorithm. For example, Litecoin and Dogecoin use the scrypt key-derivation function and Ethereum uses the Ethash algorithm. Thus, for embodiments of the miner 200 designed to mine such Altcoins, the compute engines 330 may compute these other cryptographic algorithms.

As shown, the ASIC controller 310 and I/O circuitry 320 are coupled to the control power supply 232 of the power supply 230 and to a control ground 306 of the control power domain 302. Similarly, the compute engines 330 are coupled to the one or more compute power supplies 234 of the power supply 230 and to a compute ground 308 of the compute power domain 304. Thus, the ASIC controller 310 provides two separate power domains, which may be selectively powered-up per signals of the miner controller 210. For example, the controller power domain 302 and its components therein (e.g., the ASIC controller 310 and I/O circuitry 320) may be powered up while the compute power domain 304 and its components (e.g., compute engines 330) remain in a powered-down state.

In some embodiments, the ASIC controller 310 may include various components such as capacitors, logic gates, optical transceivers, etc. that permit cross domain signaling between components of the control power domain 302 and components of the compute power domains 304 while maintaining DC separation of such power domains 302, 304. For example, in some embodiments, the ASIC controller 310 communicates with the compute engines 330 via capacitors and associated logic circuitry that provide AC signaling across domains and DC restoration of such AC signaling. Such circuitry may further aid in maintaining separation of and reducing leakage current between power domains 302, 304.

Figure 4:
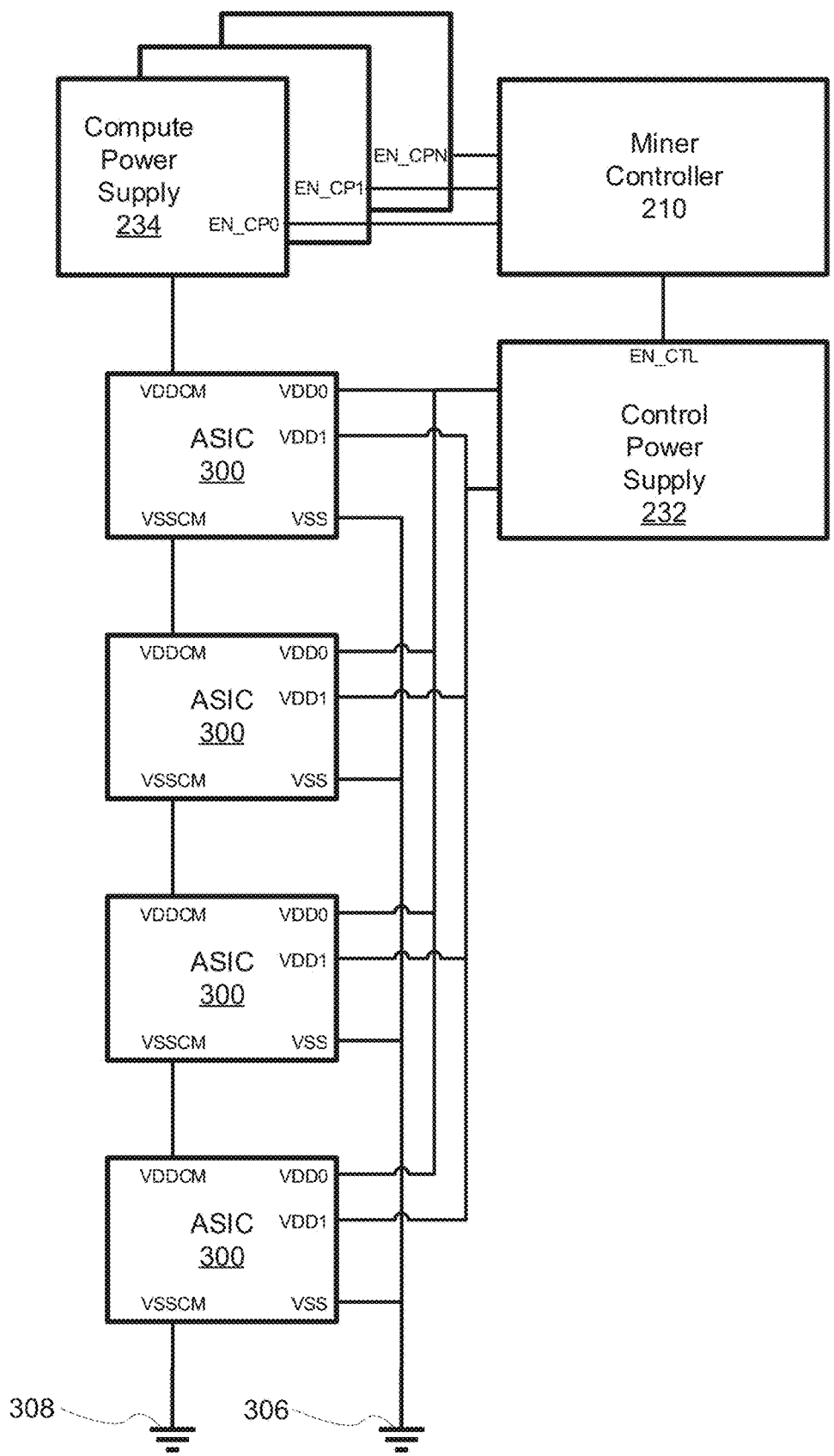
FIG. 4 shows a block diagram for aspects of a compute board of FIG. 2.

Referring now to FIG. 4 further details regarding the control of the power domains 302, 304 are described. In particular, four compute modules or ASICs 300 of a compute board 220 are shown. The quantity of ASICs 300 in FIG. 4 is provided for illustrative purposes. Other embodiments may utilize a different number of ASICs 300.

As shown, each ASIC 300 is coupled in series between the one or more compute power supply 234 and the compute ground 308. In some embodiments, the ASICs 300 may be partitioned such that each compute power supply 234 applies or supplies one or more DC voltages to a respective series of ASICs 300 and their compute power domain 304 when enabled via its control input EN_CP0, EN_CP1, EN_CPN. For illustration purposes, only a single series of ASICs 300 is depicted in FIG. 4. Conversely, each compute power supply 234 does not apply or supply DC voltages to its respective series of ASICs 300 and their compute power domain 304 when disabled via its control input EN_CP0, EN_CP1, EN_CPN. In some embodiments, each ASIC 300 may include multiple compute power domains that are each supplied by a respective compute power supply 234.

The ASICs 300 are further coupled to the control power supply 232 and the control ground 306. The control power supply 232 applies or supplies one or more DC voltages to the ASICs 300 and their respective control power domains 302 when enabled via its control input EN_CTL. Conversely, the control power supply 232 does not apply or supply DC voltages to the ASICs 300 and their respective control power domains 302 when disabled via its control input EN_CTL.

The miner controller 210 is coupled to the control input EN_CTL of the control power supply 232 and the control inputs EN_CP0, EN_CP1, EN_CPN of the one or more compute power supplies 232. As such, the miner controller 210 may selectively control the application of DC voltages to the ASICs 300 by generating appropriate control signals for the control inputs EN_CTL, EN_CP0, EN_CP1, EN_CPN.

Figure 5:
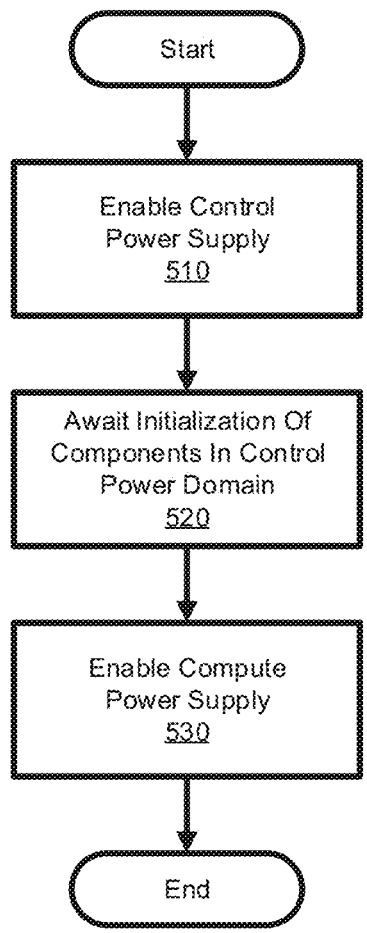
FIG. 5 shows a flowchart for a control method implemented by the miner controller of FIG. 2.

To this end, FIG. 5 depicts a flowchart for a control method 500 implemented by the miner controller 210. Typically, the miner controller 210 executes the control method 500 as part of a boot up or initialization process of the miner 200. However, the miner controller 210 may execute the control method 500 as part of other process such as, e.g., waking processes, testing processes, etc. Moreover, the following description of the control method 500 assumes that both the control power supply 232 and the compute power supply 234 are in a default disabled state prior to execution of the control method 500. Thus, prior to execution of the control method 500, neither the control power supply 232 nor the compute power supply 234 supplies power to the ASICs 300 and their respective power domains 302, 304.

At 510, the miner controller 210 may generate one or more control signals for the control input EN_CTL of the control power supply 232, which enables the control power supply 232. In response to such control signals, the control power supply 232 may supply power to the ASICs 300 and their respective control power domains 302. For example, the control power supply 232 may apply one or more voltages to the ASICs which power-up the ASIC controller 310 and I/O circuitry 320 of the control power domain 302.

Moreover, the miner controller 210 at 510 maintains the control inputs EN_CP0, EN_CP1, EN_CPN of the one or more compute power supplies 234 in a disabled state. As such, the miner controller 210 at 510 selectively powers-up the components of the ASICs 300 that reside in the control power domain 302 while maintaining components of the ASICs 300 that reside in the compute power domain 304 in a powered-down state. In this manner, the miner controller 210 may power-up and invoke initialization of the components in the control power domain 302 without powering the compute engines 222 in the compute power domain 304.

At 520, the miner controller 210 awaits the components in the control power domain 302 to complete power-up and/or initialization. To this end, the miner controller 210 may interact with the ASIC controller 310 to configure the ASIC 300 for proper operation. For example, the miner controller 210 may read, write, and/or otherwise access various control registers, flags, etc. of the ASIC 300 as part of a boot up or initialization process.

The miner controller 210 may determine that initialization has completed using various techniques. In some embodiments, the ASIC 300 may generate an interrupt to signal completion of the initialization process and the miner controller 210 may detect completion of the initialization process based on generation of the interrupt. In some embodiments, the ASIC 300 may update a flag or status register when the initialization process completes and the miner controller 210 may read such flag or status register to detect when the ASIC 300 has completed the initialization process. In other embodiments, the miner controller 210 may poll the ASICs 300 for their current status and detect the initialization has completed based on responses received from the polled ASICs 300. In yet other embodiments, the miner controller 210 may wait for a predetermined period to elapse, which is sufficiently long to ensure that the initialization process of the components in the control power domain 302 has completed.

After the components of the control power domain 302 have successfully completed the initialization process, the miner controller 210 at 530 may generate one or more control signals for the control inputs EN_CP0, EN_CP1, EN_CPN, which enables the compute power supply 234. In response to such control signals, the compute power supply 234 may supply power to the ASICs 300 and their respective compute power domains 304. For example, the compute power supply 234 may apply one or more voltages to the ASICs 300, which power-up the compute engines 330 of the compute power domain 304.

If the initialization process of the components in the control power domain 302 was not successful, the ASIC controller 310 and/or the miner controller 210 may take corrective or mitigating actions. For example, one or more compute engines 330, ASICs 300, and/or compute boards 220 may be taken off-line, disabled, or masked to either ignore results of faulty components and/or power-off faulty components.

The above separation of control domain 302 from the one or more compute power domains 304 may simplify initialization and/or improve robustness of the miner 200 in comparison to miners that utilize ASICs having a single power domain shared by both the control components and compute engines. One reason for this is that control voltage in such shared power domain implementations is dependent on the voltage applied to the series-connected ASICs. This voltage in such embodiments is likely to fluctuate during startup due to the series-connected ASICs. Moreover, the voltage of such embodiments is likely to fluctuate due to computations performed by the ASICs, which can affect reliable operation of the control components. Furthermore, in case of one or more malfunctioning ASICs, voltages applied to the ASICs may spike above operational limits thus damaging non-malfunctioning ASICs. Separating the compute and control power domains permits bringing up the control power domain and its components separately from the compute power domain and its components. As a result, the miner controller 210 and ASIC controller 310 may have greater control of the initialization of the compute boards 220 resulting in greater stability and reliability of the compute engines and their computations.

While the foregoing has been described with reference to certain aspects and examples, those skilled in the art understand that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular examples disclosed, but that the disclosure includes all examples falling within the scope of the appended claims.

What is claimed is:

1. A cryptocurrency miner, comprising:
   one or more power supplies;
   a first integrated circuit electrically coupled to the one or more power supplies, wherein the first integrated circuit comprises one or more first compute engines and first control circuitry configured to control operation of the one or more first compute engines; and
   a controller configured to:
      generate one or more first control signals that cause the one or more power supplies to power the first control circuitry of the first integrated circuit and to not power the one or more first compute engines of the first integrated circuit during an initialization process of the first control circuitry;
      detect that the initialization process of the first control circuitry has completed; and
      generate one or more second control signals that cause the one or more power supplies to power the first control circuitry and the one or more first compute engines of the first integrated circuit after detecting that the initialization process of the first control circuitry has completed.

2. The cryptocurrency miner of claim 1, comprising:
   a second integrated circuit comprising one or more second compute engines and second control circuitry configured to control operation of the one or more second compute engines; and
   wherein the one or more second compute engines are electrically coupled to the one or more power supplies via the first integrated circuit.

3. The cryptocurrency miner of claim 2, wherein the controller is configured to:
   generate one or more third control signals that cause the one or more power supplies to power the second control circuitry of the second integrated circuit and to not power the one or more second compute engines of the second integrated circuit during the initialization process; and
   generate one or more fourth control signals that cause the one or more power supplies to power the second control circuitry and the one or more second compute engines of the second integrated circuit after the initialization process.

4. The cryptocurrency miner of claim 2, comprising:
a first application specific integrated circuit (ASIC) implements the first integrated circuit; and
a second ASIC implements the second integrated circuit.

5. The cryptocurrency miner of claim 1, wherein each first compute engine of the one or more first compute engines comprises a hashing engine.

6. The cryptocurrency miner of claim 1, wherein each first compute engine of the one or more first compute engines comprises a SHA-256 hashing engine.

7. The cryptocurrency miner of claim 2, comprising:
a network interface; and
wherein the controller is configured to receive, via the network interface, jobs from a pool server of a mining pool and distribute the jobs to the first integrated circuit and the second integrated circuit.

8. The cryptocurrency miner of claim 1, wherein the controller is configured to detect that the initialization process has completed based on an interrupt signal generated by the first integrated circuit.

9. The cryptocurrency miner of claim 1, wherein the controller is configured to detect that the initialization process has completed based on a status register of the first integrated circuit.

10. The cryptocurrency miner of claim 1, wherein the controller is configured to poll the first integrated circuit for its status and detect that the initialization process has completed based on a response received from the first integrated circuit.

11. An integrated circuit, comprising:
a first power domain comprising a plurality of compute engines, wherein each compute engine is configured to generate a hash value;
a second power domain comprising control circuitry, wherein the second power domain is distinct from the first power domain, and wherein the control circuitry is configured to control operation of the plurality of compute engines;
one or more first power inputs configured to receive first electrical power and deliver the first electrical power to the first power domain and the plurality of compute engines of the first power domain; and
one or more second power inputs configured to receive second electrical power and deliver the second electrical power to the second power domain and the control circuitry of the second power domain.

12. The integrated circuit of claim 11, wherein each compute engine of the plurality of compute engines comprises a SHA-256 hashing engine.

13. The integrated circuit of claim 11, wherein:
the second power domain comprises an I/O interface; and
the one or more second power inputs are configured to deliver the second electrical power to the I/O interface of the second power domain.

14. The integrated circuit of claim 11, wherein:
the second power domain comprises an oscillator; and
the one or more second power inputs are configured to deliver the second electrical power to the oscillator of the second power domain.

15. The integrated circuit of claim 11, wherein the first power domain and the second power domain permit powering components of the second power domain while components of the first power domain remain powered down.

16. A cryptocurrency miner, comprising:
one or more power supplies;
a plurality of compute boards, wherein each compute board comprises a plurality of compute integrated circuits, and wherein each compute integrated circuit comprises an integrated circuit controller and a plurality of compute engines; and
a miner controller configured to control the one or more power supplies such that the one or more power supplies:
power each integrated circuit controller of the plurality of compute integrated circuits and not power the compute engines of the plurality of compute integrated circuits during an initialization process of its respective compute board; and
power the compute engines of a first compute board of the plurality of compute boards after successfully completing the initialization process of the first compute board.

17. The cryptocurrency miner of claim 16, wherein the plurality of compute integrated circuits of the first compute board are coupled in series between a ground and the one or more power supplies.

18. The cryptocurrency miner of claim 16, wherein each compute engine of the plurality of compute boards comprises a hashing engine.

19. The cryptocurrency miner of claim 16, wherein each compute engine of the plurality of compute boards computes a SHA-256 hash.

20. The cryptocurrency miner of claim 16, wherein:
each compute integrated circuit of a first compute board of the plurality of compute boards comprises an I/O interface; and
the miner controller is configured to control the one or more power supplies such that the one or more power supplies power the I/O interface of each compute integrated circuit of the first compute board during the initialization process of the first compute board.

21. The cryptocurrency miner of claim 16, wherein:
each compute integrated circuit of a first compute board of the plurality of compute boards comprises an oscillator; and
the miner controller is configured to control the one or more power supplies such that the one or more power supplies power the oscillator of each compute integrated circuit of the first compute board during the initialization process of the first compute board.

22. The cryptocurrency miner of claim 16, comprising:
a network interface;
wherein the miner controller is configured to receive, via the network interface, jobs from a pool server of a mining pool, and distribute the jobs among the plurality of compute boards.

* * * * *